United States Patent
Yamazaki et al.

(10) Patent No.: US 10,696,598 B2
(45) Date of Patent: Jun. 30, 2020

(54) DIELECTRIC PORCELAIN COMPOSITION AND ELECTRONIC COMPONENT

(71) Applicants: TDK CORPORATION, Tokyo (JP); NATIONAL UNIVERSITY CORPORATION HOKKAIDO UNIVERSITY, Sapporo-shi, Hokkaido (JP)

(72) Inventors: Kumiko Yamazaki, Tokyo (JP); Yuki Nagamine, Tokyo (JP); Takeshi Shibahara, Tokyo (JP); Shinichi Kikkawa, Sapporo (JP); Yuji Masubuchi, Sapporo (JP)

(73) Assignees: TDK CORPORATION, Tokyo (JP); NATIONAL UNIVERSITY CORPORATION HOLLAIDO UNIVERSITY, Sapporo-shi (JP)

( * ) Notice: Subject to any disclaimer, the term of this patent is extended or adjusted under 35 U.S.C. 154(b) by 35 days.

(21) Appl. No.: 16/074,406

(22) PCT Filed: Feb. 1, 2017

(86) PCT No.: PCT/JP2017/003581
§ 371 (c)(1),
(2) Date: Jul. 31, 2018

(87) PCT Pub. No.: WO2017/135298
PCT Pub. Date: Aug. 10, 2017

(65) Prior Publication Data
US 2019/0202744 A1    Jul. 4, 2019

(30) Foreign Application Priority Data
Feb. 1, 2016   (JP) .................. 2016-017477

(51) Int. Cl.
*C04B 35/58* (2006.01)
*H01B 3/12* (2006.01)
(Continued)

(52) U.S. Cl.
CPC ........ *C04B 35/58* (2013.01); *C04B 35/58007* (2013.01); *C04B 35/58014* (2013.01);
(Continued)

(58) Field of Classification Search
CPC ..................................................... C04B 35/58
See application file for complete search history.

(56) References Cited

U.S. PATENT DOCUMENTS

| 4,734,390 A | 3/1988 | Marchand et al. |
| 6,432,325 B1 * | 8/2002 | Hamada .................. H01J 1/142 252/518.1 |

(Continued)

FOREIGN PATENT DOCUMENTS

| JP | S61-122108 A | 6/1986 |
| JP | 2013-001625 A | 1/2013 |
| JP | 2013-128073 A | 6/2013 |

OTHER PUBLICATIONS

Aug. 7, 2018 International Preliminary Report on Patentability issued in International Patent Application No. PCT/JP2017/003581.
(Continued)

*Primary Examiner* — Karl E Group
(74) *Attorney, Agent, or Firm* — Oliff PLC

(57) ABSTRACT

To provide a dielectric porcelain composition and an electronic component that demonstrate ferroelectricity. A dielectric porcelain composition that is characterized by having a perovskite-type oxynitride as a principal component and by including a polycrystalline body that demonstrates ferroelectricity.

11 Claims, 17 Drawing Sheets

(51) Int. Cl.
*C04B 35/626* (2006.01)
*B22F 3/12* (2006.01)

(52) U.S. Cl.
CPC ...... *C04B 35/6265* (2013.01); *C04B 35/6268* (2013.01); *C04B 35/62675* (2013.01); *C04B 35/62685* (2013.01); *H01B 3/12* (2013.01); *B22F 3/12* (2013.01); *C04B 2235/3213* (2013.01); *C04B 2235/3251* (2013.01); *C04B 2235/442* (2013.01); *C04B 2235/604* (2013.01); *C04B 2235/6586* (2013.01); *C04B 2235/664* (2013.01); *C04B 2235/768* (2013.01); *C04B 2235/77* (2013.01); *C04B 2235/85* (2013.01)

(56) References Cited

U.S. PATENT DOCUMENTS

| | | | | |
|---|---|---|---|---|
| 7,931,821 | B2* | 4/2011 | Saito | C01B 21/0821 252/62.9 PZ |
| 8,848,336 | B2* | 9/2014 | Koutsaroff | C01G 23/006 361/306.1 |
| 8,981,626 | B2* | 3/2015 | Miura | H01L 41/187 252/62.9 PZ |
| 2010/0155647 | A1* | 6/2010 | Saito | C01B 21/0821 252/62.9 PZ |
| 2013/0154443 | A1 | 6/2013 | Miura et al. | |

OTHER PUBLICATIONS

Oka et al., "Possible ferroelectricity in perovskite oxynitride SrTaO2N epitaxial thin films," Scientific Reports, May 16, 2014, vol. 4, No. 4987, pp. 1-10, DOI: 10.1038/srep04987.

Motohashi et al., "Crystal Structure and Dielectric Properties of Tantalum Oxynitride Perovskite SrTaO2N," Ceramics Japan, Jul. 2013, vol. 48, No. 7, pp. 503-507.

Sun et al., "Additive Sintering, Postannealing, and Dielectric Properties of SrTaO2N," Journal of the American Ceramic Society, 2014 vol. 97, No. 4, pp. 1023-1027.

Zhang et al., "Sintering and dielectric properties of perovskite SrTaO2N ceramics," Journal of the European Ceramic Society, 2012, vol. 32, No. 6, pp. 1269-1274.

Masubuchi et al., "Dielectric Property and Sintering of Perovskite-Type Oxynitride Solid-Solutions," Annual Report of the Murata Science Foundation, 2014, No. 28, pp. 632-640.

Masubuchi et al., "High pressure densification and dielectric properties of perovskite-type oxynitride SrTaO2N," Journal of the European Ceramic Society, 2015, vol. 35, pp. 1191-1197.

Apr. 25, 2017 International Search Report issued in International Patent Application No. PCT/JP2017/003581.

* cited by examiner

DIELECTRIC PORCELAIN COMPOSITION AND ELECTRONIC COMPONENT

TECHNICAL FIELD

The present invention relates to a dielectric porcelain composition and an electronic component.

RELATED ART

In accordance with high performance digital equipment, there has been a demand for electronic components achieving both high Tc and high permittivity. Incidentally, Tc refers to a ferroelectric transition temperature.

Barium titanate has been widely used as electronic components. In electronic components using barium titanate as a main component of dielectrics, structural phase transition is employed for appearance of permittivity. In this case, there must be low Tc for high permittivity, and it is difficult to achieve both high permittivity and high Tc.

If an oxynitride, which is typified by $SrTaO_2N$, can be used as a main component of dielectrics, structural phase transition is not utilized for appearance of permittivity, and it is thereby considered that both high permittivity and high Tc can be achieved. It is, however, difficult to employ an oxynitride, which is typified by $SrTaO_2N$, as a main component of bulk dielectrics. Specifically, nitrogen disappears in a firing step for manufacture of a sintered material of an oxynitride, which is typified by $SrTaO_2N$, and it is thereby difficult to manufacture bulk dielectrics.

For example, Patent Documents 1 and 2 disclose a method of manufacturing a powder of perovskite-type oxynitride $ABO_2N$. Patent Documents 1 and 2, however, do not disclose that a ferroelectric sintered material is actually obtained by molding a powder into a predetermined shape. Non-patent Document 1 discloses that a thin film comprising perovskite-type oxynitride $ABO_2N$ is manufactured, but does not disclose that ferroelectric sintered material is obtained.

PATENT DOCUMENT

Patent Document 1: Japanese Laid-Open Patent Publication No. S61-122108
Patent Document 2: Japanese Laid-Open Patent Publication No. 2013-001625

NON-PATENT DOCUMENT

Non-Patent Document 1: Scientific Reports 4. DOI: 10.1038/srep04987

SUMMARY OF THE INVENTION

Problems to be Solved by the Invention

The present invention has been achieved under such circumstances. It is an object of the invention to provide a dielectric porcelain composition exhibiting ferroelectricity and an electronic component.

Solution to Problem

A dielectric porcelain composition according to the present invention comprises polycrystals having a main component of a perovskite-type oxynitride and exhibiting ferroelectricity.

Preferably, the polycrystals comprise a sintered material.

Preferably, the main component of the perovskite-type oxynitride is represented by $A_aB_bO_oN_n$ (a+b+o+n=5), where "A" is one or more elements selected from Sr, Ba, Ca, La, Ce, Pr, Nd, and Na, and where "B" is one or more elements selected from Ta, Nb, Ti, and W.

Preferably, the dielectric porcelain composition according to the present invention comprises a region satisfying a/b>1 and o/2>n≥0.7.

Preferably, the dielectric porcelain composition according to the present invention comprises a plurality of crystal particle phases and a crystal grain-boundary phase present among the crystal particle phases.

Preferably, $A_{out}>A_{in}$ and $B_{out}<B_{in}$ are satisfied, where $A_{in}$ (mol %) is a concentration of A-site ions present in the crystal particle phases, $B_{in}$ (mol %) is a mol concentration of B-site ions present in the crystal particle phases, $A_{out}$ (mol %) is a mol concentration of A-site ions present in the crystal grain-boundary phases, and $B_{out}$ (mol %) is a mol concentration of B-site ions present in the crystal grain-boundary phases.

Preferably, a composition of the crystal particle phases is closer to $ABO_2N$ than a composition of the crystal grain-boundary phases.

Preferably, crystal lattice is continuous between the crystal particle phases and the crystal grain-boundary phases.

An electronic component according to the present invention comprises the dielectric porcelain composition.

MODES FOR CARRYING OUT THE INVENTION

Figure 1A:
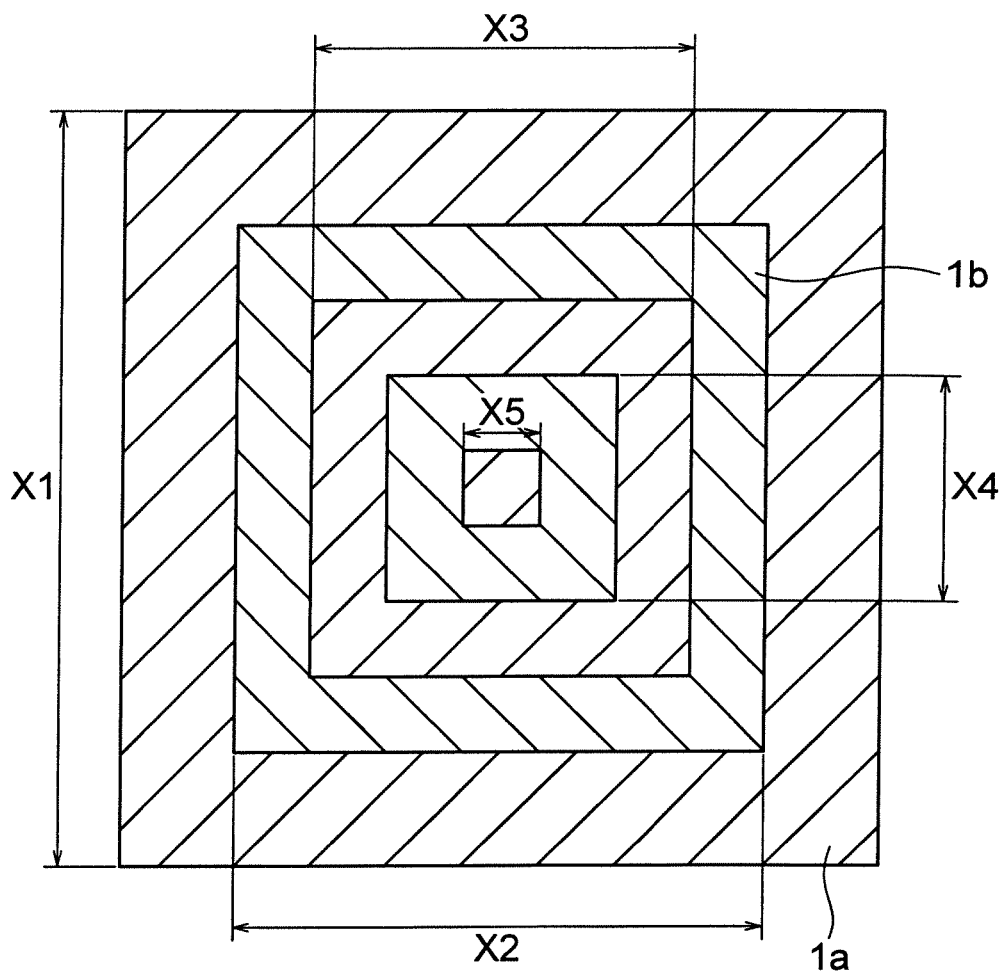
FIG. 1A is a schematic view of a polarization pattern manufactured in a piezoelectric response test.

Hereinafter, the present invention is described based on an embodiment.

A dielectric porcelain composition according to the present embodiment includes polycrystals having a main component of a perovskite-type oxynitride and exhibiting ferroelectricity.

The perovskite-type oxynitride can be represented by a composition formula of $A_aB_bO_oN_n$ (a+b+o+n=5). "A" is an A-site ion of the perovskite-type oxynitride. "B" is a B-site ion of the perovskite-type oxynitride.

Preferably, "A" is one or more elements selected from Sr, Ba, Ca, La, Ce, Pr, Nd, and Na. "A" is more preferably one or more elements selected from Sr, Ba, La, and Nd because high capacitance can be obtained, and "A" is the most preferably Sr. Preferably, "B" is one or more elements selected from Ta, Nb, Ti, and W. "B" is more preferably one or more elements selected from Ta and Ti because a dielectric porcelain composition having less different phases can be obtained, and "B" is the most preferably Ta.

Moreover, the dielectric porcelain composition according to the present embodiment preferably includes a region satisfying a/b>1 and o/2>n≥0.7. This reason is described below.

In the perovskite-type oxynitride, a total of an average valence of the A-site ion and an average valence of the B-site ion is preferably (7±X) valence (X≤0.3), and is the most preferably seven valent (X=0).

Here, the average valence refers to an averaged value of valences of ions present in the A-site and B-site based on their abundance ratio. For example, there is a case where Sr and La are present by 4:1 in the A-site and Ta and Ti are present in the B-site by 4:1. The valence of Sr ions is two, and the valence of La ions is three. Thus, α is calculated by Formula (1) below, where a is the average valence of Sr and La in this case. Moreover, the valence of Ta ions is five, and the valence of Ti ions is four. Thus, β is calculated by Formula (2) below, where β is the average valence of Ta and Ti in this case. Then, α=2.2 and β=4.8 are satisfied, and the total (α+β) of these average valences is seven.

$$\alpha = \text{(valence of } Sr \text{ ions)} \times \text{(abundance ratio of } Sr \text{ ions)} + \text{(valence of } La \text{ ions)} \times \text{(abundance ratio of } La \text{ ions)} = 2 \times 4/5 + 3 \times 1/5 = 2.2$$ Formula (1)

$$\beta = \text{(valence of } Ta \text{ ions)} \times \text{(abundance ratio of } Ta \text{ ions)} + \text{(valence of } Ti \text{ ions)} \times \text{(abundance ratio of } Ti \text{ ions)} = 5 \times 4/5 + 4 \times 1/5 = 4.8$$ Formula (2)

Incidentally, a total of average valences of the present application is calculated with a/b=1 when having A-site rich or B-site rich, that is, even if having a/b≠1. In the above case, for example, the total of average valences is 2.2+4.8=7 even if having a/b=1.2.

Moreover, the dielectric porcelain composition includes a crystal grain-boundary phase present among two or more crystal particle phases having a main component of the perovskite-type oxynitride. Incidentally, the crystal particle phases and the crystal grain-boundary phase can be distinguished by SEM-EDS etc.

Preferably, $A_{out}>A_{in}$ and $B_{out}<B_{in}$ are satisfied, where $A_{in}$ (mol %) is a concentration of A-site ions present in the crystal particle phases, $B_{in}$ (mol %) is a mol concentration of B-site ions present in the crystal particle phases, $A_{out}$ (mol %) is a mol concentration of A-site ions present in the crystal grain-boundary phase, and $B_{out}$ (mol %) is a mol concentration of B-site ions present in the crystal grain-boundary phase. When $A_{out}>A_{in}$ and $B_{out}<B_{in}$ are satisfied, O can stably be present in the crystal grain-boundary phase, and grain-boundary insulation is improved.

The concentration of each element in the crystal particle phases and the crystal grain-boundary phase is measured by any method. For example, this concentration can be measured using EPMA etc.

Moreover, a composition of the crystal particle phases is preferably closer to $ABO_2N$ than a composition of the crystal grain-boundary phase. Here, what a composition is close to $ABO_2N$ means that a composition is close to a stoichiometric ratio of $ABO_2N$, and means that a composition is close to a:b:o:n=1:1:2:1.

More specifically, a composition of the crystal particle phases preferably satisfies 1.0≤a≤1.2, 0.1≤b≤0.9, 1.5≤o≤2.5, and 0.1≤n≤1.0.

Moreover, crystal lattice of the crystal particle phases and the crystal grain-boundary phase are preferably continuous. The fact that crystal lattice is continuous can be confirmed by analysis of scanning transmission electron microscope (STEM), for example. When the STEM analysis is carried out, an arrangement state of crystal lattice in the crystal particle phases and the crystal grain-boundary phase can be observed as a lattice stripe. For example, when an arrangement state of crystal lattice in the crystal particle phases and the crystal grain-boundary phase is observed as a lattice stripe and 90% or more of the entire lattice stripe is continuous while interposing interfaces of the crystal particle phases and the crystal grain-boundary phase, it can be said that crystal lattice is continuous. Then, when crystal lattice is continuous, crystal structure is similar.

The STEM analysis is carried out at any magnification where a lattice stripe can be observed, such as around 2,000,000 times, although it depends upon a device and a camera length (a valid distance from a specimen to a surface where a diffraction pattern to be observed is formed). Moreover, both of the crystal particle phases and the crystal grain-boundary phase preferably have a perovskite-type structure. When crystal lattice is continuous, it is assumed that the crystal particle phases and the crystal grain-boundary phase have the same crystal structure. That is, when the crystal particle phases have a perovskite-type structure and crystal lattice is continuous, it is assumed that the crystal grain-boundary phase also has a perovskite-type structure.

In an image obtained as a result of the STEM analysis, crystal lattice is continuous and brightness is different, between the crystal particle phases and the crystal grain-boundary phase. In the STEM image obtained by the STEM analysis, contrast varies in accordance with atomic number of a portion being observed. That is, the difference in brightness in the STEM image means that compositions are different.

In the dielectric porcelain composition according to the present embodiment, the crystal particle phases have ferroelectricity, and permittivity is extremely high due to ferroelectricity of the crystal particle phases. That is, if obtaining high permittivity is only considered, it is conceivable that an abundance ratio of the crystal grain-boundary phases should be small. In the dielectric porcelain composition according to the present embodiment, however, grain-boundary insulation is preferably maintained. Thus, the crystal grain-boundary phases are preferably present to some degree.

Here, in order to avoid disturbance of improvement in permittivity due to ferroelectricity of the crystal particle phases and to maintain grain-boundary insulation, crystal lattice is preferably continuous, and an O content of the crystal grain-boundary phase is larger than an O content of the crystal particle phases. Incidentally, the composition of the crystal particle phases and the composition of the crystal grain-boundary phase can be confirmed by electron probe micro analyzer (EPMA), scanning transmission electron microscope-energy dispersive X-ray spectroscopy (STEM-EDS), or the like.

In the dielectric porcelain composition according to the present embodiment, a Sr content and an O content are relatively large at a portion around the outermost surface (this portion refers to an outermost layer below). Thus, the outermost layer is a portion satisfying a/b>1 and o/2>n≥0.7. The outermost layer has any thickness, but a portion whose depth from the outermost surface is approximately 8 μm is considered as the outermost layer satisfying a/b>1 and o/2>n≥0.7 in the dielectric porcelain composition according to the present embodiment. Preferably, a/b is 1.1 or more.

The dielectric porcelain composition according to the present embodiment may include an auxiliary component. There is no particular limit to type or content of the auxiliary component, and the auxiliary component may be included as long as characteristics of dielectric porcelain composition are not affected. Examples of the auxiliary component include a sintering additive of $SrCO_3$, SrO, etc. For example, the amount of the auxiliary component may be 5 wt % or less provided that the amount of the main component is 100 wt %.

The dielectric porcelain composition according to the present embodiment is characterized by exhibiting ferroelectricity. In the present embodiment, a state where ferroelectricity is exhibited refers to a state where a polarization pattern can be confirmed when using a piezoresponse microscope (PRM) with predetermined conditions. Incidentally, presence or absence of ferroelectricity and degree of relative permittivity do not necessarily correspond to each other.

Method of Manufacturing Dielectric Porcelain Composition

Next, a method of manufacturing the dielectric porcelain composition is described. Hereinafter, A-site atom is Sr and B-site atom is Ta, but the dielectric porcelain composition is manufactured similarly even if other elements are employed.

First of all, a perovskite-type $SrTaO_2N$ powder is manufactured.

The perovskite-type $SrTaO_2N$ powder is manufactured by any method, such as a gelation nitridation method and a solid-phase reaction method.

In the gelation nitridation method, for example, a gel substance is obtained by heating $SrCO_3$, $TaCl_5$, citric acid, and absolute ethanol at 50 to 150° C. while stirring them for 0.5 to 3 hours. Glycine, EDTA, etc. may be used instead of citric acid, and ethanol etc. may be used instead of absolute ethanol.

Next, the resulting gel substance is calcined at 250 to 450° C. for 1 to 3 hours, and an amorphous oxide precursor is obtained. The calcination is carried out in any atmosphere, such as the air.

Next, the resulting amorphous oxide precursor is subjected to a nitriding reaction, and a perovskite-type $SrTaO_2N$ powder can be obtained. The nitriding reaction can be carried out using, for example, a tubular furnace, but may be carried out using another furnace. When a tubular furnace is used, the perovskite-type $SrTaO_2N$ powder can be obtained by supplying $NH_3$ at 40 to 200 ml/min and heating the amorphous oxide precursor at 900 to 1000° C. for 5 to 24 hours.

In the solid-phase reaction method, a $SrTaO_2N$ precursor can be obtained by heating the $SrCO_3$ powder and the $Ta_2O_5$ powder at 1100 to 1300° C. for 12 to 40 hours while pulverizing them every 6 to 10 hours. This heating is carried out in any atmosphere, such as the air.

Next, the resulting $Sr_2Ta_2O_7$ precursor is subjected to a nitriding reaction, and a perovskite-type $SrTaO_2N$ powder can be obtained. The nitriding reaction can be carried out using, for example, a rotary kiln furnace, but may be carried out using another furnace. When a rotary kiln furnace is used, the perovskite-type $SrTaO_2N$ powder can be obtained by supplying $NH_3$ at 40 to 200 ml/min and heating the $Sr_2Ta_2O_7$ precursor for 80 to 120 hours while pulverizing it every 10 to 20 hours at 900 to 1000° C.

The perovskite-type $SrTaO_2N$ powder obtained by the above method may be mixed with a sintering additive of $SrCO_3$. When the perovskite-type $SrTaO_2N$ powder is mixed with $SrCO_3$, the amount of $SrCO_3$ is preferably 2 to 5 wt % with respect to 100 wt % of the perovskite-type $SrTaO_2N$ powder.

Next, the perovskite-type $SrTaO_2N$ powder is subjected to a CIP molding at a pressure of, for example, 100 to 200 MPa, and a $SrTaO_2N$ green compact is obtained. The perovskite-type $SrTaO_2N$ powder is not limited to being molded by a CIP molding, and may be molded by another method, such as dry molding and wet molding.

The resulting $SrTaO_2N$ green compact is fired, and a dielectric porcelain composition is obtained. In the present embodiment, the firing temperature is particularly important. The firing temperature is 1400° C. or more, preferably 1400 to 1450° C. When the firing temperature is 1400° C. or more, it is assumed that some of N contained in the $SrTaO_2N$ green compact are removed and defects are generated in the crystal particles. The firing time is not limited, but is preferably 3 to 6 hours. The firing atmosphere is not limited, but is preferably an $N_2$ atmosphere of 0.1 to 0.6 MPa.

Here, it is considered that defects generated by the firing, particularly defects present around the outermost layer, are filled with N by an annealing treatment in an atmosphere including $NH_3$, and a dielectric porcelain composition according to the present embodiment can be obtained. Preferably, the annealing treatment is carried out at 900 to 1050° C. Preferably, the annealing time is 5 to 20 hours. In the annealing treatment, $NH_3$ is preferably supplied at a rate of 40 to 200 ml/min. When the annealing temperature, the partial pressure of $O_2$, the supply rate of $NH_3$, and the like are adjusted appropriately, Sr can be excessive compared to Ta and O can be excessive compared to N, around the outermost layer.

A dielectric porcelain composition where a portion satisfying a/b>1 and o/2>n≥0.7 with a main composition of $A_aB_bO_oN_n$ is mainly formed around the outermost layer can be obtained by the above-mentioned manufacturing process.

A dielectric porcelain composition where crystal lattice is continuous between the crystal particle phases and the crystal grain-boundary phase can be obtained by the above-mentioned manufacturing process.

In the dielectric porcelain composition according to the present embodiment, a/b>1 is satisfied around the outermost layer, that is, a portion of A-site rich is included, and N thereby becomes hard to be removed during the annealing, whereby N and O are finally filled sufficiently. Thus, the dielectric porcelain composition according to the present embodiment exhibits a ferroelectricity that can obtain piezoelectric response. Moreover, when a/b>1 is satisfied around the outermost layer, a sufficient amount of O satisfying o/2>n≥0.7 is filled around the outermost layer of the dielectric porcelain composition according to the present embodiment, and insulation can be achieved.

Preferably, o/2>n≥0.7 is satisfied around the outermost layer of the dielectric porcelain composition according to the present embodiment. When the amount of defects around the outermost layer is reduced like o/2>n≥0.7, dielectric characteristics can be high.

There is no particular limit as to a method of obtaining an electronic component from the dielectric porcelain composition according to the present embodiment. For example, a single-plate type ceramic capacitor, which is one of electronic components, can be obtained by forming electrodes in such a manner that Pt electrodes, Ag electrodes, or the like are printed on face-to-face two surfaces of a green compact comprising the resulting dielectric porcelain composition and are baked as necessary.

An embodiment of the present invention is described above, but the present invention is not limited to the embodiment, and may of course be achieved in variously different embodiments within the scope not deviating the gist thereof.

There is no limit as to type of the electronic component of the present invention. Examples of the electronic component of the present invention include capacitors, thermistors, filters, diplexers, resonators, transmitters, antennas, piezoelectric elements, and ferroelectric memories. In particular, the electronic component of the present invention is advantageously used as an electronic component requiring ferroelectricity.

EXAMPLES

Hereinafter, the present invention is described based on more detailed examples, but is not limited thereto.

Example 1 and Comparative Example 1

In the present examples, a solid-phase reaction method was employed for manufacture of a perovskite-type $SrTaO_2N$ powder.

A strontium carbonate ($SrCO_3$) powder and a tantalum oxide ($Ta_2O_5$) powder as raw material powders of the perovskite-type $SrTaO_2N$ powder were prepared so that the substance amount of Sr and the substance amount of Ta were approximately the same.

First of all, the $SrCO_3$ powder and the $Ta_2O_5$ powder were heated for 25 hours at 1200° C. while pulverizing them every 10 hours, and a $Sr_2Ta_2O_7$ precursor was thereby obtained. The heating atmosphere was the air.

Next, the resulting $Sr_2Ta_2O_7$ precursor was subjected to a nitriding reaction, and a perovskite-type $SrTaO_2N$ powder was thereby obtained. In the nitriding reaction, a rotary kiln furnace was used. The perovskite-type $SrTaO_2N$ powder was obtained by supplying $NH_3$ at 100 ml/min and heating the $Sr_2Ta_2O_7$ precursor for 100 hours while pulverizing it every 30 hours at 1000° C.

Next, the perovskite-type $SrTaO_2N$ powder was subjected to CIP molding at 150 MPa, and a column green compact of diameter 5.2 mm×thickness 1.7 mm was obtained.

The green compact was fired in an atmosphere having a nitrogen partial pressure of 0.2 MPa at 1400° C. for 3 hours, and a sintered material was obtained.

Moreover, the sintered material was subjected to an annealing treatment at 1000° C. The annealing treatment was carried out at an ammonia supply rate of 100 ml/min, and a dielectric porcelain composition of Example 1 was obtained.

A composition obtained by removing the surfaces of the dielectric porcelain composition of Example 1 by 10 μm was considered to be a dielectric porcelain composition of Comparative Example 1.

Hereinafter, a measurement method and an evaluation method of characteristics are described.

(Elemental Intensity of Outermost Layer and Inner Part)

Referring to the cross section of Example 1, mapping images of elements of Sr, Ta, O, and N were prepared in a visual field of 50 μm×50 μm including the outermost surface using an EPMA. The results are shown in FIG. 2A to FIG. 5A. An interface between an outermost surface 2a and an inner part 2b was visually determined by the mapping images. In Example 1, the depth of the outermost layer 2a was about 8 μm. Moreover, line analysis was carried out horizontally with respect to each of a part having a depth of 0 to 8 μm included in the outermost layer 2a and a part having a depth of 20 to 50 μm included in the inner part 2b, provided that the outermost surface was 0 μm. The results are shown in FIG. 2B to FIG. 5B. Moreover, line analysis was carried out vertically to any part of the mapping images. The results are shown in FIG. 2C to FIG. 5C.

From the mapping images of FIG. 2A to FIG. 5A, it can be understood that a concentration distribution of each element exhibits a different tendency between the outermost layer 2a and the inner part 2b. As a result of the horizontal line analysis shown in FIG. 2B to FIG. 5B, it is understood that Sr and O are relatively abundant in the depth included in the outermost layer 2a, and that Ta and N are relatively abundant in the depth included in the inner part 2b. As a result of the vertical line analysis shown in FIG. 2C to FIG. 5C, it is understood that Sr and O are more abundant in the part included in the outermost layer 2a than the part included in the inner part 2b, and that Ta and N are more abundant in the part included in the inner part 2b than the part included in the outermost layer 2a. It is thereby understood that Sr and O are relatively abundant in the outermost layer 2a and Ta and N are relatively abundant in the inner part 2b.

("a/b", "o/2", and "n" of Outermost Layer)

"a/b", "o/2", and "n" of the outermost layer were measured using an EPMA line analysis on the cross section obtained by cutting the sintered material. An interface between the outermost layer and the inner part was visually determined by the mapping images. The results are shown in Table 1.

TABLE 1

|  | a/b | o/2 | n | Piezoelectric Response |
|---|---|---|---|---|
| Example 1 | 1.04 | 1.12 | 0.91 | present |
| Comp. Ex. 1 | 1.00 | 1.00 | 1.00 | absent |

According to Table 1, "a/b" of Example 1 was 1.04, which was larger than 1, while "a/b" of Comparative Example 1 was 1.00.

(Piezoelectric Response)

Piezoelectric response was evaluated using AFM and XRD. In addition, a piezo-response microscope (PRM), which was one of modes of AFM, was used.

Figure 1B:
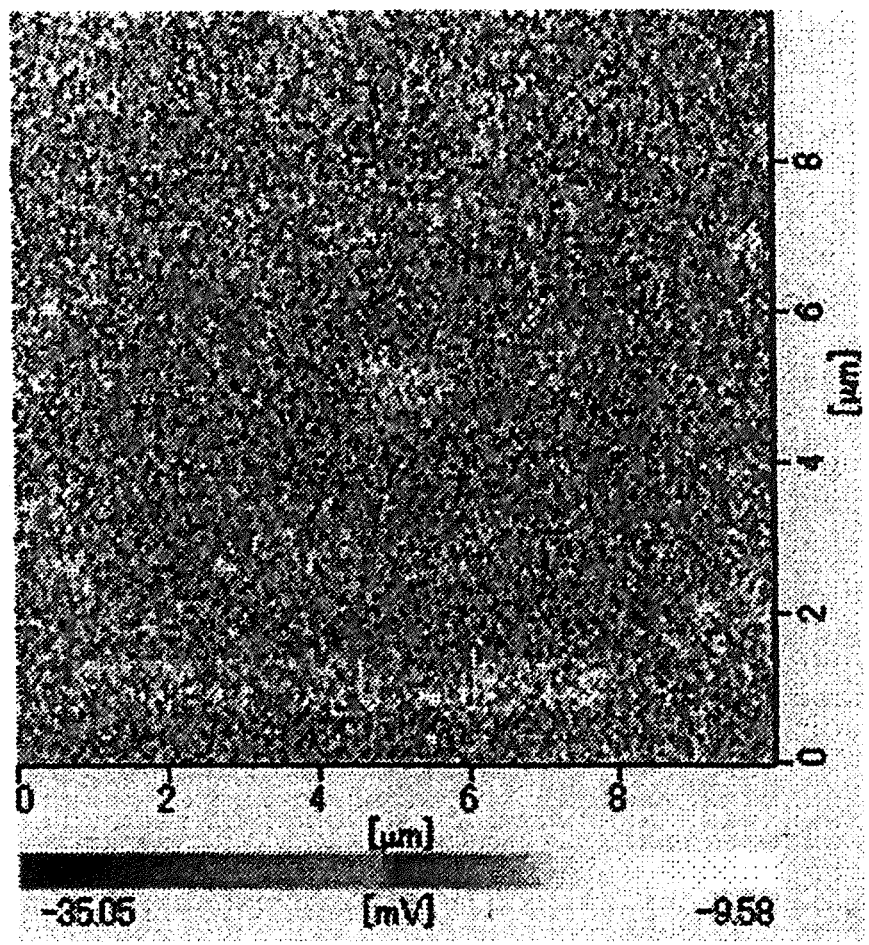
FIG. 1B is an Acos image of a polarization pattern manufactured in a piezoelectric response test.
Figure 2A:
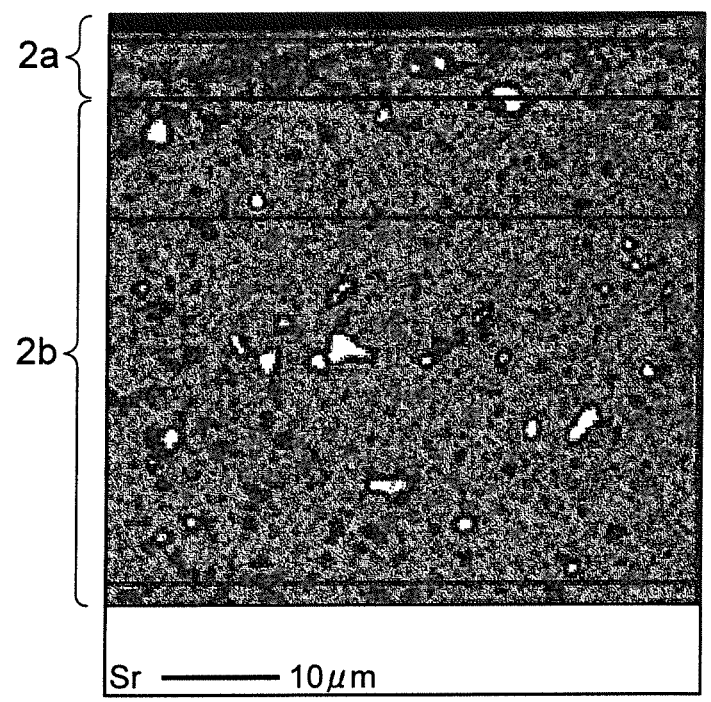
FIG. 2A is an element mapping of Sr on a cut surface of a dielectric porcelain composition manufactured in Example 1.
Figure 2B:
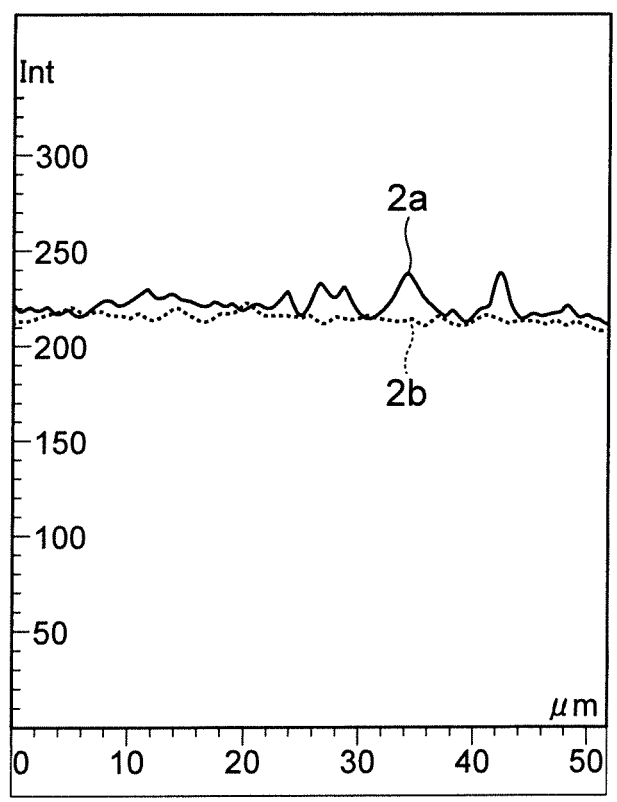
FIG. 2B is a result of a horizontal line analysis in the element mapping of FIG. 2A.
Figure 2C:
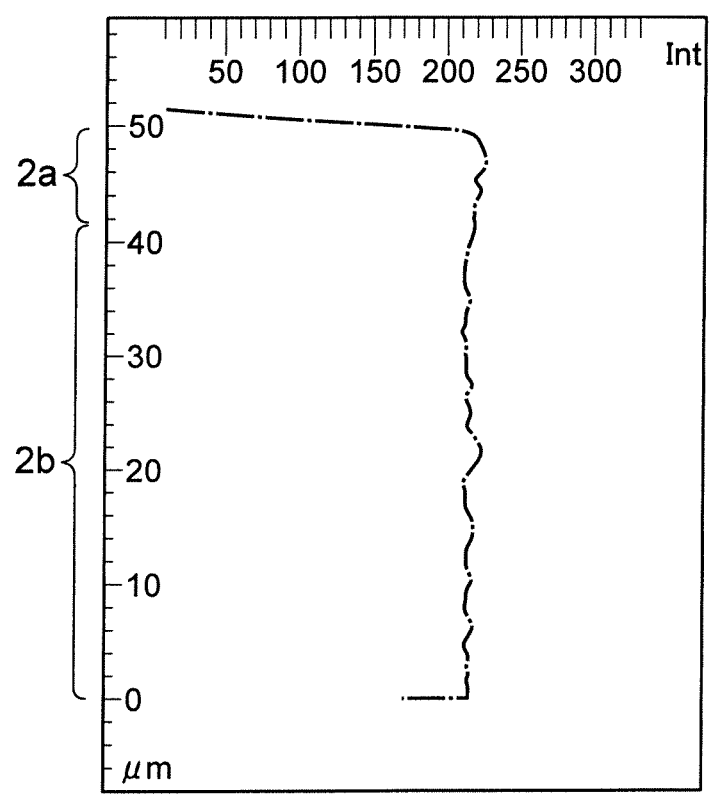
FIG. 2C is a result of a vertical line analysis in the element mapping of FIG. 2A.
Figure 3A:
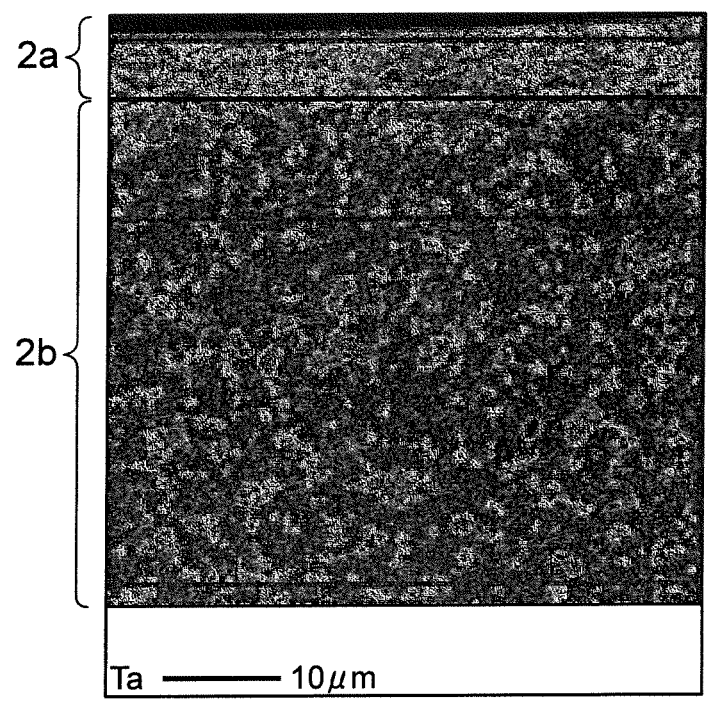
FIG. 3A is an element mapping of Ta on a cut surface of a dielectric porcelain composition manufactured in Example 1.
Figure 3B:
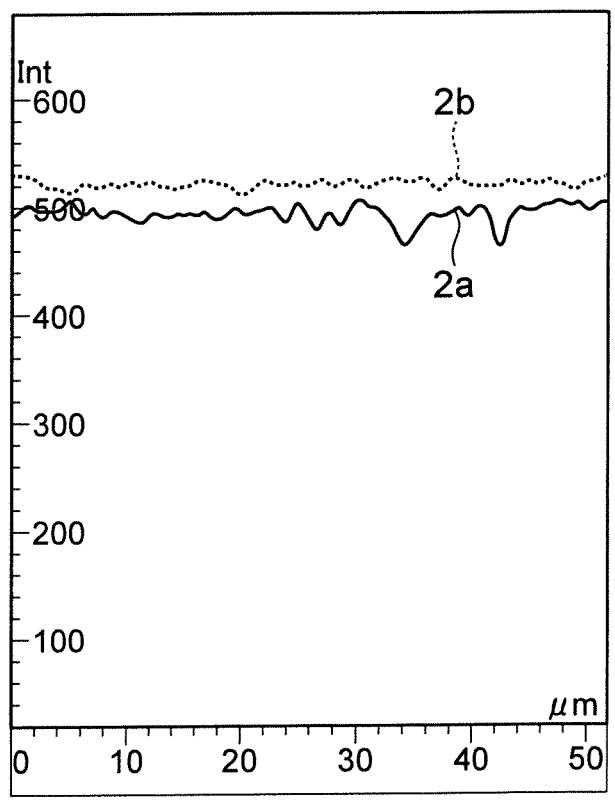
FIG. 3B is a result of a horizontal line analysis in the element mapping of FIG. 3A.
Figure 3C:
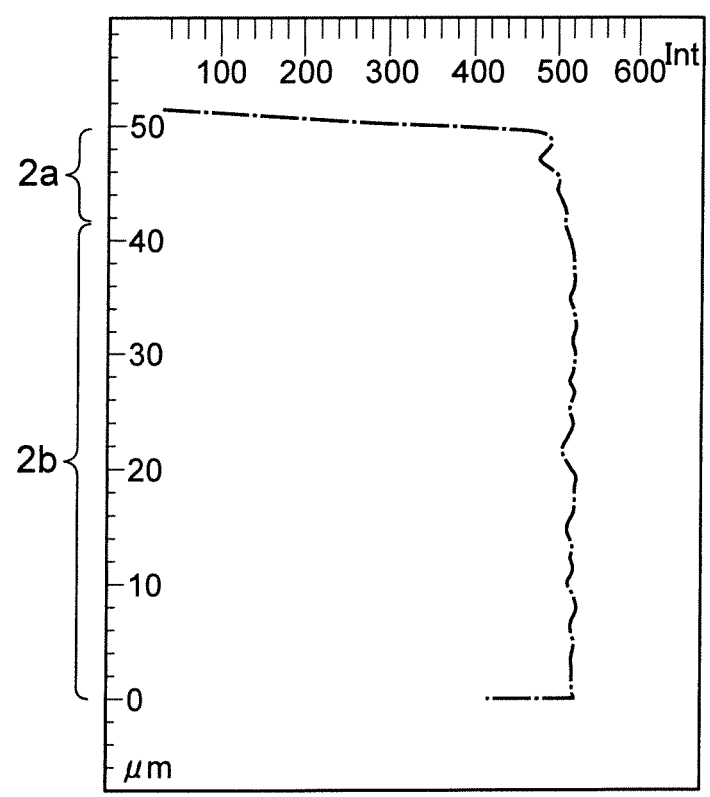
FIG. 3C is a result of a vertical line analysis in the element mapping of FIG. 3A.
Figure 4A:
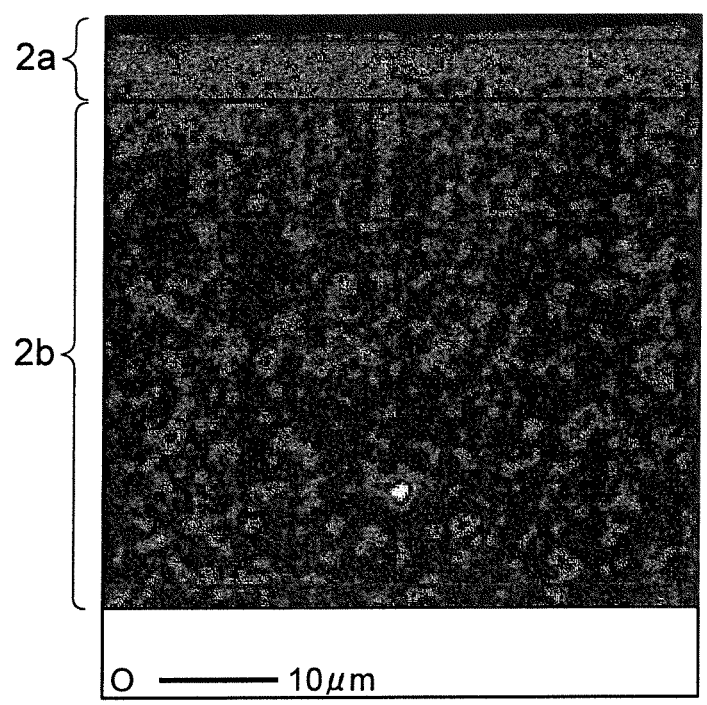
FIG. 4A is an element mapping of O on a cut surface of a dielectric porcelain composition manufactured in Example 1.
Figure 4B:
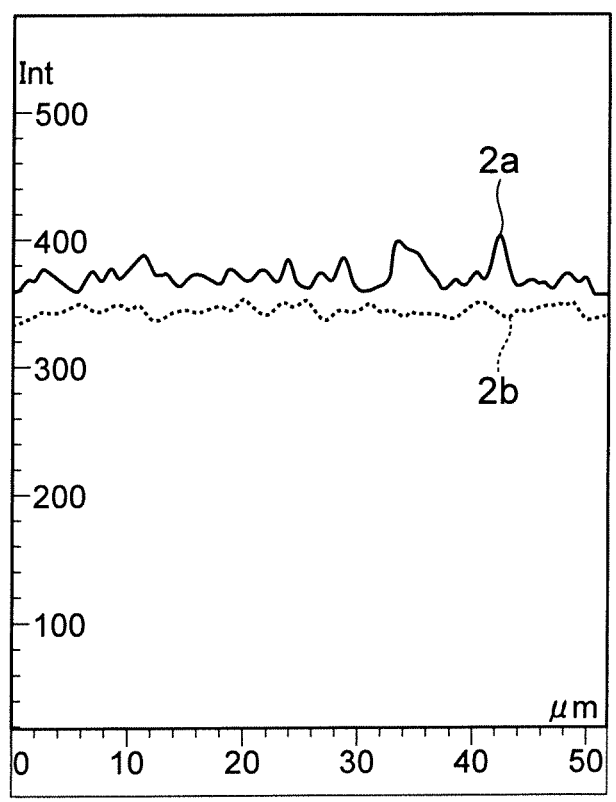
FIG. 4B is a result of a horizontal line analysis in the element mapping of FIG. 4A.
Figure 4C:
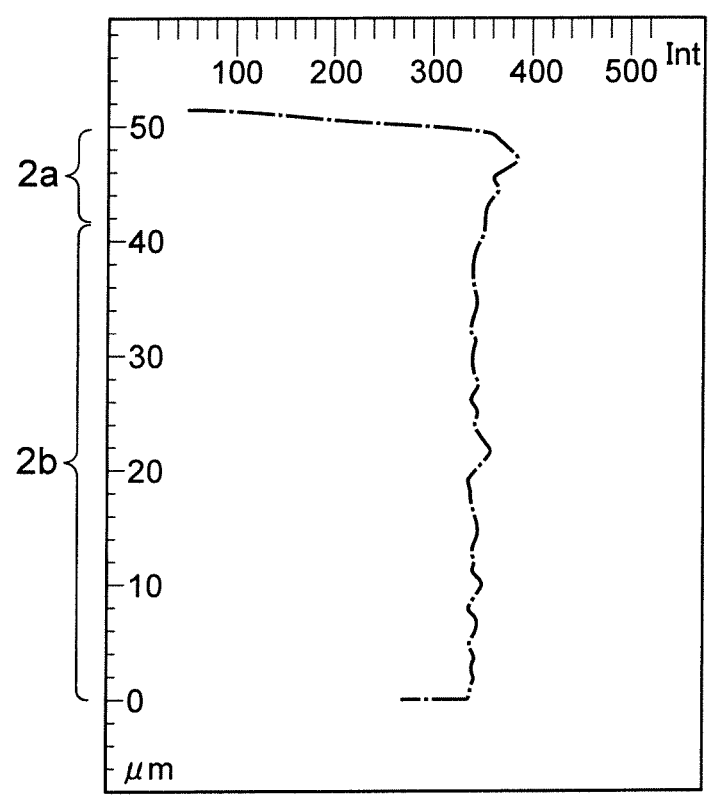
FIG. 4C is a result of a vertical line analysis in the element mapping of FIG. 4A.
Figure 5A:
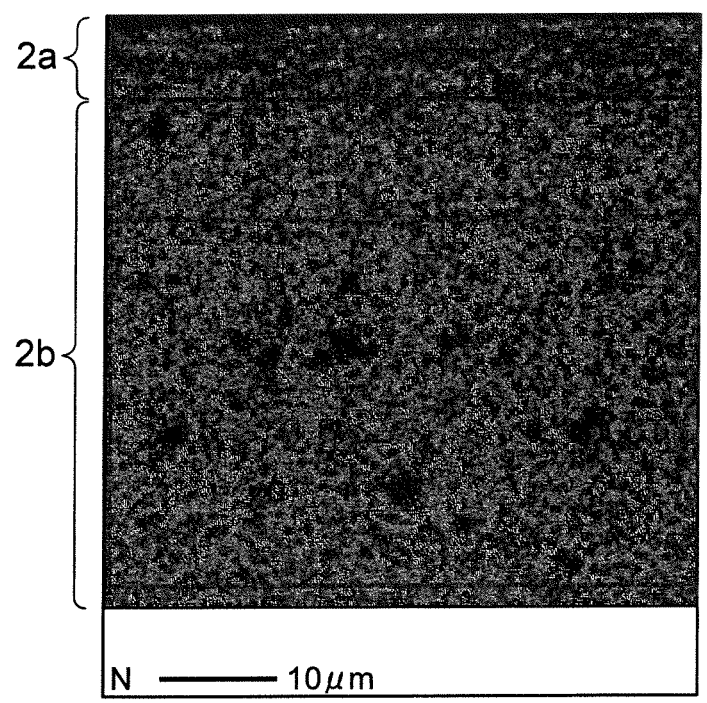
FIG. 5A is an element mapping of N on a cut surface of a dielectric porcelain composition manufactured in Example 1.
Figure 5B:
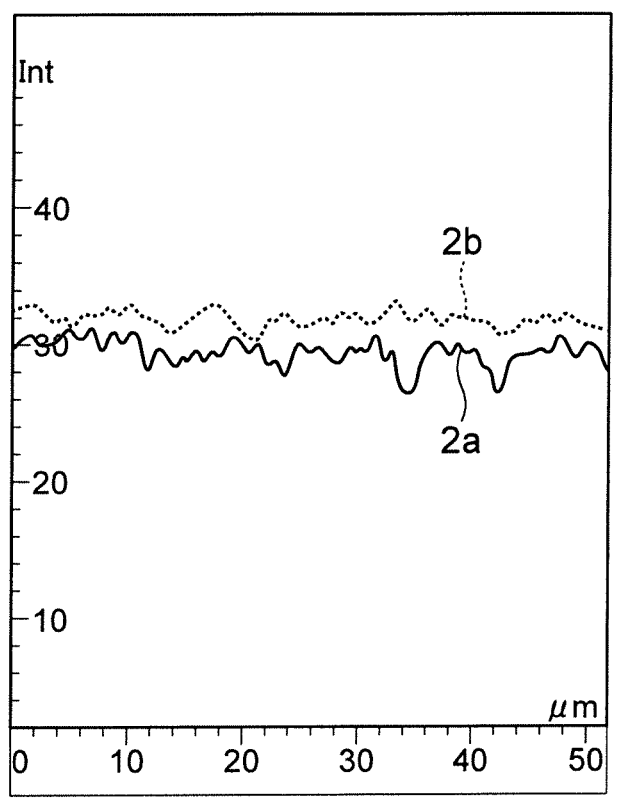
FIG. 5B is a result of a horizontal line analysis in the element mapping of FIG. 5A.
Figure 5C:
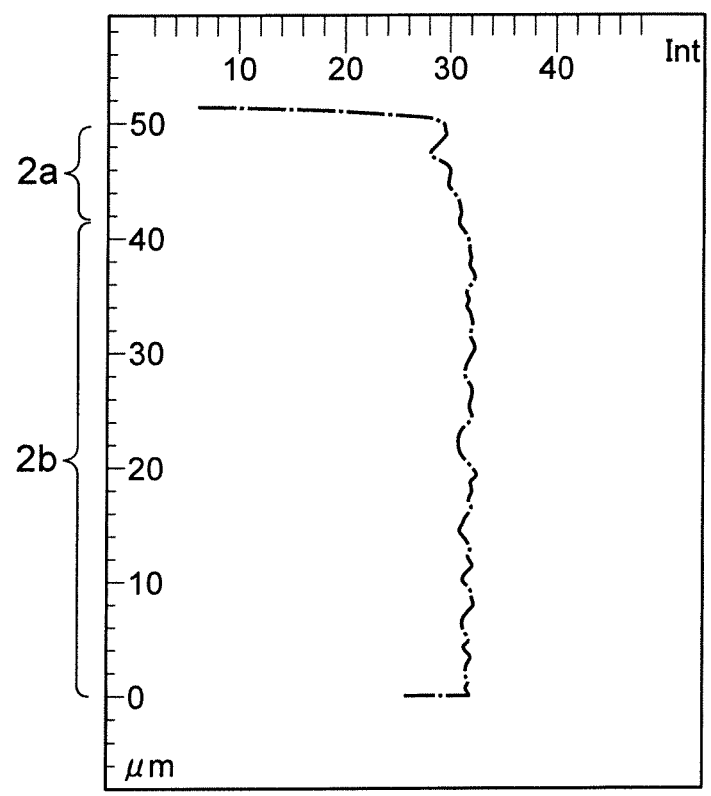
FIG. 5C is a result of a vertical line analysis in the element mapping of FIG. 5A.

A polarization pattern shown in FIG. 1A was formed on the surfaces of the dielectric porcelain compositions of Example 1 and Comparative Example 1. Specifically, a voltage of −10V was applied to a square of X1=10 μm, a voltage of +10V was subsequently or simultaneously applied to a central square of X2=7 μm, a voltage of −10V was subsequently or simultaneously applied to a central square of X3=5 μm, a voltage of +10V was subsequently or simultaneously applied to a central square of X4=3 μm, and a voltage of −10V was subsequently or simultaneously applied to a central square of X5=1 μm, whereby the surfaces were polarized. Then, voltage was applied to the polarization pattern shown in FIG. 1A as an excitation voltage (external alternating electric field) of −3V to +3V at scanning frequency 0.5 Hz. As shown in FIG. 1A, there consequently existed a polarization pattern alternately having sections 1a of voltage −10V and sections 1b of voltage +10V from end to center. Then, an Acos image of the polarization pattern was observed. The Acos image is shown in FIG. 1B. SEM images after the polarization pattern had been formed were photographed, and it was confirmed that the surface of the dielectric porcelain composition was not largely rugged. In Example 1, the polarization pattern was confirmed as shown in FIG. 1B. Thus, it was confirmed that the dielectric porcelain composition of Example 1 had ferroelectricity. On the contrary, no polarization pattern was confirmed in Comparative Example 1.

EPMA analysis was carried out in Example 1 and Comparative Example 1. The results are shown in Table 2. Incidentally, no clear grain-boundary phase was confirmed in Comparative Example 1, and the composition of measurement points in the crystal grain boundary was unmeasurable. Meanwhile, Example 1 had a comparatively thick and clear grain-boundary layer of 5 to 50 nm.

TABLE 2

| No. | Measurement Point | Sr | Ta | O | N |
|---|---|---|---|---|---|
| Example 1 | main phase | 23.5 | 20.5 | 36.6 | 17.3 |
| | main phase | 23.9 | 21.4 | 35.2 | 17.4 |
| | grain boundary | 27.7 | 16.7 | 45.7 | 5.1 |
| Comp. Ex. 1 | main phase | 24.5 | 21.6 | 36.2 | 17.3 |
| | main phase | 24.5 | 21.9 | 35.4 | 17.8 |
| | grain boundary | — | — | — | — |

According to Table 2, the compositions of the measurement points in the crystal particle of Example 1 were closer to $SrTaO_2N$ than the composition of the measurement point in the crystal grain boundary with respect to stoichiometry.

Moreover, $Sr_{out} > Sr_{in}$ and $Ta_{out} < Ta_{in}$ were satisfied, where $Sr_{in}$ (mol %) was a concentration of Sr ions present in crystal particle phases of Example 1, $Ta_{in}$ (mol %) was a mol concentration of Ta ions present in the crystal particle phases, $Sr_{out}$ (mol %) was a mol concentration of Sr ions present in the crystal grain-boundary phases, and $Ta_{out}$ (mol %) was a mol concentration of Ta ions present in the crystal grain-boundary phases.

Moreover, electrodes were formed on both surfaces of the dielectric porcelain composition of Example 1 and Comparative Example 1, and capacitor samples were manufactured.

(Relative Permittivity (ε))

Relative permittivity a of the capacitor samples of Example 1 and Comparative Example 1 was measured. Relative permittivity ε of the capacitor samples was calculated from capacitance measured under conditions of frequency 400 Hz and input signal level (measurement voltage) 500 mVrms using an impedance analyzer at reference temperature 20° C. The results are shown in Table 3.

(Density of Sintered Material)

Density of sintered material of the capacitor samples of Example 1 and Comparative Example 1 was measured. Density of sintered material was defined as ratio provided that theoretical density was 100%. In the present examples, a density of sintered material of 80% or more was considered to be good.

TABLE 3

| | Density of sintered material (%) | ε (400 Hz) | Piezoelectric Response |
|---|---|---|---|
| Example 1 | 80 | 3500 | present |
| Comp. Ex. 1 | 95 | 21000 | absent |

According to Table 3, the dielectric porcelain composition of Example 1 had piezoelectric response and exhibited ferroelectricity, while the dielectric porcelain composition of Comparative Example 1 had a relative permittivity that was higher than a relative permittivity of Example 1 but did not exhibit ferroelectricity.

Example 1 was subjected to XRD analysis, and it was confirmed that the dielectric porcelain composition of Example 1 was a perovskite-type oxynitride.

(Continuity of Crystal Lattice and Compositions of Crystal Particle Phase and Crystal Grain-Boundary Phase)

Figure 6:
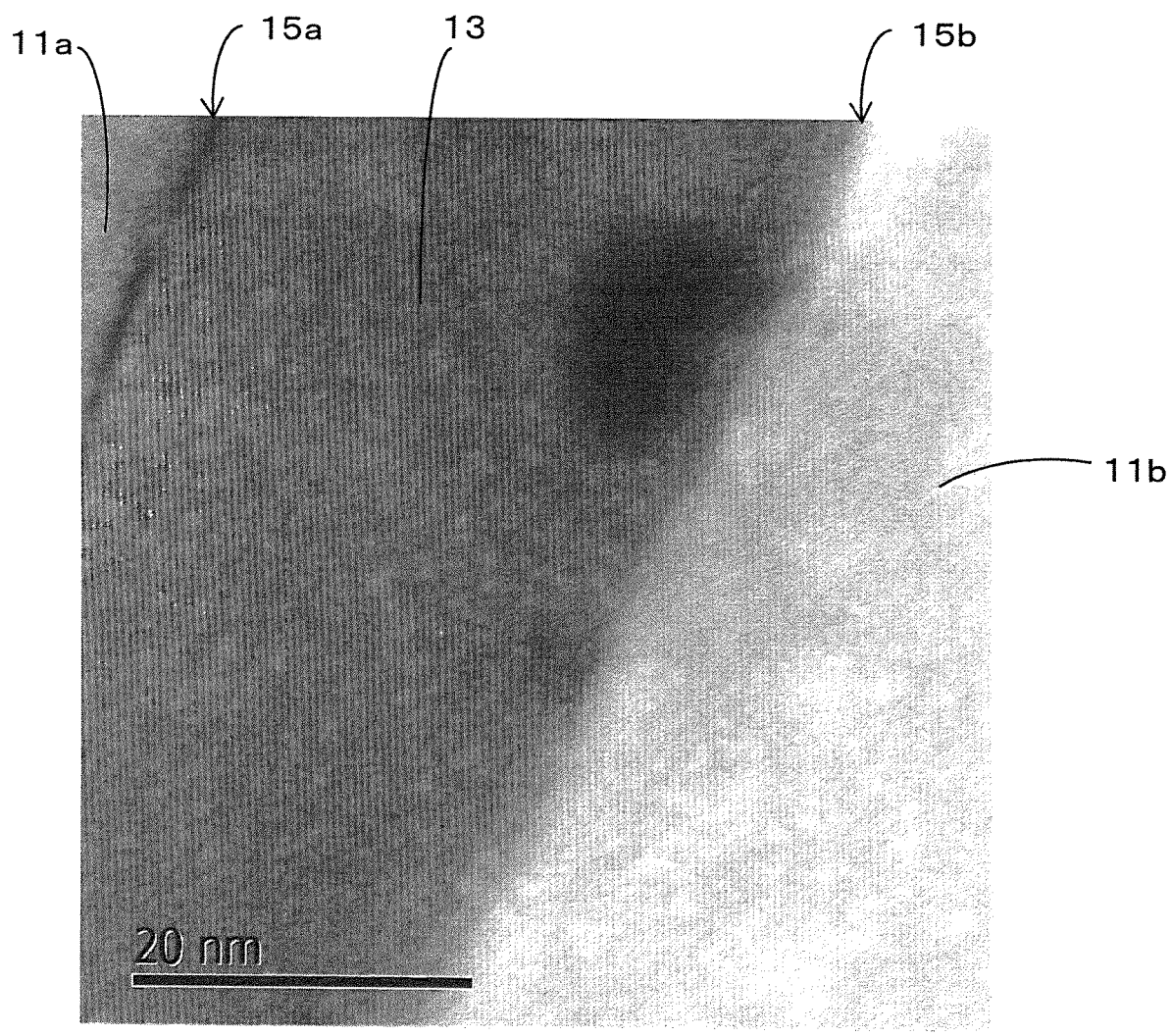
FIG. 6 is a STEM image of a dielectric porcelain composition manufactured in Example 1.

A surface portion of ferroelectric layer was taken from the dielectric porcelain composition of Example 1 using a focused ion beam (FIB) and was turned into flakes. Thereafter, STEM analysis was carried out at a magnification of 1800,000 times, and crystal particle phases 11a and 11b and a crystal grain-boundary phase 13 were observed. The STEM image is shown in FIG. 6. Incidentally, an interface between the crystal particle phase 11a and the crystal grain-boundary phase 13 was defined as an interface 15a, and an interface between the crystal particle phase 11b and the crystal grain-boundary phase 13 was defined as an interface 15b.

As understood from FIG. 6, each of the crystal particle phases 11a and 11b and the crystal grain-boundary phase 13 had a lattice pattern, and the lattice patterns were continuous while interposing the crystal particle phases 11a and 11b. That is, it is understood that the crystal lattice of the dielectric porcelain composition of Example 1 was continuous between the crystal particle phases 11a and 11b and the crystal grain-boundary phase 13.

Figure 7:
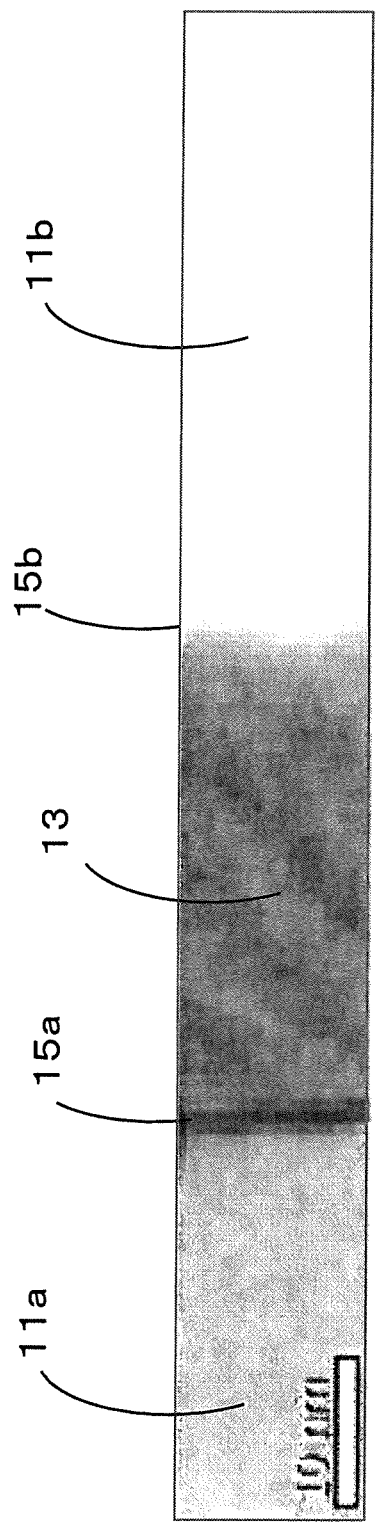
FIG. 7 is a STEM image of a dielectric porcelain composition manufactured in Example 1.
Figure 8:
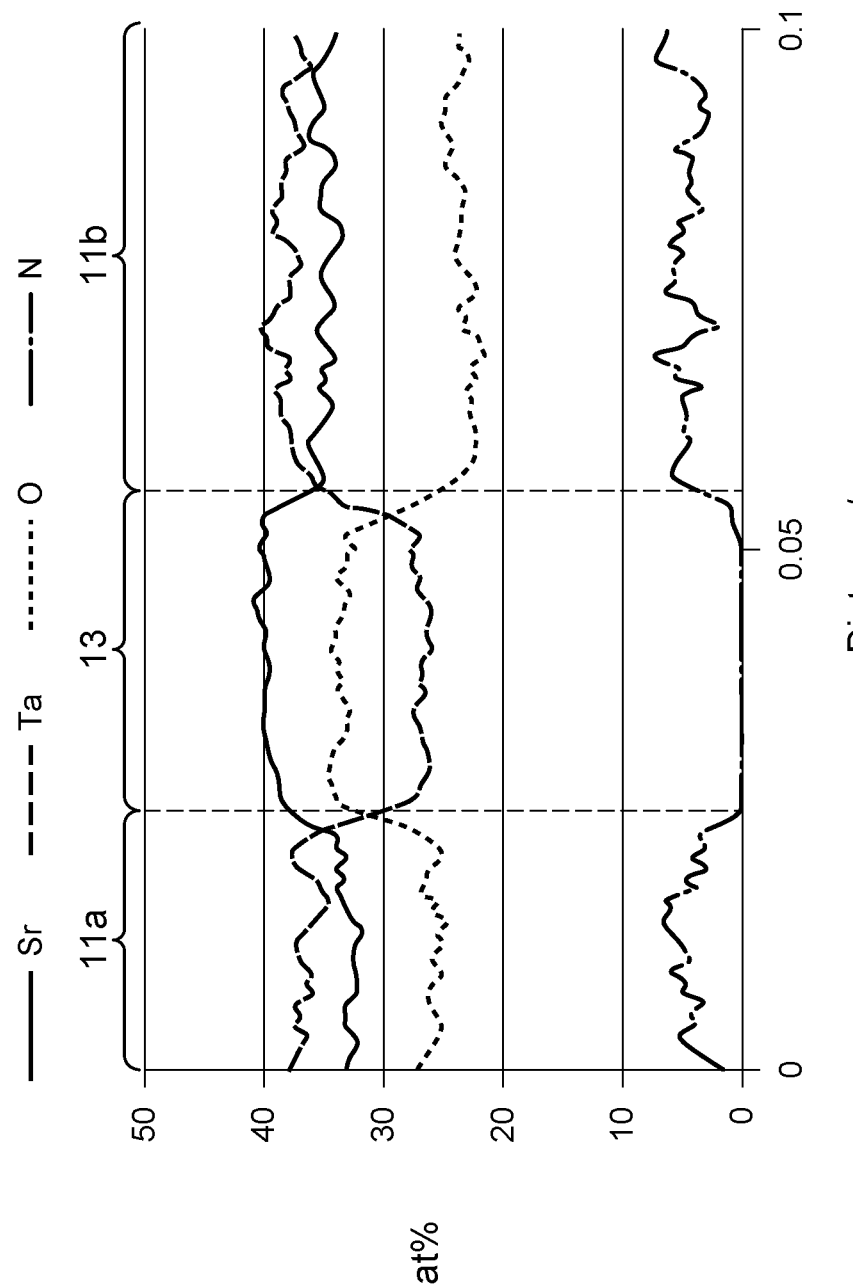
FIG. 8 is an analysis result of compositions of crystal particle phases and a crystal grain-boundary phase shown in FIG. 7 by STEM-EDS.

Moreover, FIG. 7 is a part of a STEM image obtained by STEM analysis at a similar magnification. FIG. 8 is a result of line analysis for the crystal particle phase 1a, the crystal grain-boundary phase 13, and the crystal particle phase 11b of FIG. 7 using STEM-EDS. FIG. 8 does not illustrate the interface 15a or the interface 15b. Incidentally, the length of the line analysis was 110 nm.

As understood from FIG. 8, the Sr content and the O content were larger and the Ta content and the N content were smaller in the crystal grain-boundary phase 13, compared to the crystal particle phases 11a and 11b. In particular, the O content was large in the crystal grain-boundary phase 13, and it is thereby possible to maintain grain-boundary insulation and obtain a comparatively high permittivity.

DESCRIPTION OF THE REFERENCE NUMERALS

1a . . . section at voltage −10V
1b . . . section at voltage +10V
2a . . . outermost layer 2b . . . inner part
11a, 11b . . . crystal particle phase
13 . . . crystal grain-boundary phase
15a, 15b . . . interface

The invention claimed is:

1. A dielectric porcelain composition, comprising polycrystals having a main component of a perovskite-type oxynitride and exhibiting ferroelectricity,
wherein the main component of the perovskite-type oxynitride is represented by $A_aB_bO_oN_n$ (a+b+o+n=5), where "A" is one or more elements selected from Sr, Ba, Ca, La, Ce, Pr, Nd, and Na, and where "B" is one or more elements selected from Ta, Nb, Ti, and W, and the dielectric porcelain composition comprises a region satisfying a/b≥1.04 and o/2>n≥0.7.

2. The dielectric porcelain composition according to claim 1, wherein the polycrystals comprise a sintered material.

3. The dielectric porcelain composition according to claim 1, comprising a plurality of crystal particle phases and a crystal grain-boundary phase present among the crystal particle phases.

4. The dielectric porcelain composition according to claim 3, wherein $A_{out}>A_{in}$ and $B_{out}<B_{in}$ are satisfied, where $A_{in}$ (mol %) is a concentration of A-site ions present in the crystal particle phases, $B_{in}$ (mol %) is a mol concentration of B-site ions present in the crystal particle phases, $A_{out}$ (mol %) is a mol concentration of A-site ions present in the crystal grain-boundary phase, and $B_{out}$ (mol %) is a mol concentration of B-site ions present in the crystal grain-boundary phase.

5. The dielectric porcelain composition according to claim 3, wherein a composition of the crystal particle phases is closer to $ABO_2N$ than a composition of the crystal grain-boundary phase.

6. The dielectric porcelain composition according to claim 4, wherein a composition of the crystal particle phases is closer to $ABO_2N$ than a composition of the crystal grain-boundary phase.

7. The dielectric porcelain composition according to claim 3, wherein crystal lattice is continuous between the crystal particle phases and the crystal grain-boundary phase.

8. The dielectric porcelain composition according to claim 4, wherein crystal lattice is continuous between the crystal particle phases and the crystal grain-boundary phase.

9. The dielectric porcelain composition according to claim 5, wherein crystal lattice is continuous between the crystal particle phases and the crystal grain-boundary phase.

10. The dielectric porcelain composition according to claim 6, wherein crystal lattice is continuous between the crystal particle phases and the crystal grain-boundary phase.

11. An electronic component comprising the dielectric porcelain composition according to claim 1.

* * * * *